United States Patent
Halpern (10) Patent No.: US 10,970,232 B2
(45) Date of Patent: Apr. 6, 2021

(54) VIRTUAL ROOT OF TRUST FOR DATA STORAGE DEVICE

(71) Applicant: Western Digital Technologies, Inc., San Jose, CA (US)

(72) Inventor: Joseph Halpern, Hayward, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 212 days.

(21) Appl. No.: 15/638,179

(22) Filed: Jun. 29, 2017

(65) Prior Publication Data
US 2018/0189194 A1 Jul. 5, 2018

Related U.S. Application Data

(60) Provisional application No. 62/441,715, filed on Jan. 3, 2017.

(51) Int. Cl.
*G06F 12/14* (2006.01)
*G06F 21/64* (2013.01)
(Continued)

(52) U.S. Cl.
CPC ...... *G06F 12/1408* (2013.01); *G06F 12/1433* (2013.01); *G06F 21/57* (2013.01);
(Continued)

(58) Field of Classification Search
CPC .... G06F 12/1408; G06F 21/57; G06F 21/602; G06F 21/64; G06F 21/78; G06F 21/10;
(Continued)

(56) References Cited

U.S. PATENT DOCUMENTS

| | | | |
|---|---|---|---|
| 2002/0016919 A1* | 2/2002 | Sims, III | G06F 21/10 713/193 |
| 2011/0162075 A1* | 6/2011 | Lin | G06F 21/10 726/26 |

(Continued)

OTHER PUBLICATIONS

International Search Report and Written Opinion dated Apr. 6, 2018, from counterpart International Application No. PCT/US2017/068376, 10 pgs.

*Primary Examiner* — Shewaye Gelagay
*Assistant Examiner* — Moeen Khan
(74) *Attorney, Agent, or Firm* — Barry IP Law, P.C.

(57) ABSTRACT

A Data Storage Device (DSD) includes a Non-Volatile Memory (NVM) including a private partition with a write-once partition only internally accessed by a controller of the DSD. Data stored in at least one memory of the controller and in the private partition is encrypted. According to one aspect, the NVM includes a firmware partition, and at least one key associated with the DSD stored in the write-once partition is descrambled or decrypted using a scrambler key or decryption key stored in the firmware partition. According to another aspect, a method for establishing a root of trust includes generating a scrambler key or a decryption key, and generating at least one key associated with the DSD. The scrambler key or the decryption key is stored in a firmware partition of an NVM of the DSD, and the at least one key associated with the DSD is stored in a write-once partition.

18 Claims, 4 Drawing Sheets

(51) Int. Cl.
*G06F 21/57* (2013.01)
*H04L 29/06* (2006.01)
*H04L 9/14* (2006.01)
*H04W 12/04* (2009.01)
*G06F 21/78* (2013.01)
*H04L 9/08* (2006.01)
*G06F 21/60* (2013.01)
*G06F 21/73* (2013.01)
*G06F 21/10* (2013.01)

(52) U.S. Cl.
CPC .......... *G06F 21/602* (2013.01); *G06F 21/64* (2013.01); *G06F 21/78* (2013.01); *H04L 9/0897* (2013.01); *H04L 9/14* (2013.01); *H04L 63/0428* (2013.01); *H04L 63/0442* (2013.01); *H04W 12/04* (2013.01); *G06F 21/10* (2013.01); *G06F 21/73* (2013.01); *H04L 2463/103* (2013.01)

(58) Field of Classification Search
CPC ....... G06F 21/73; H04L 9/14; H04L 63/0428; H04L 63/0442; H04L 2463/103; H04L 9/0897; H04W 12/04
USPC .......................................................... 713/155
See application file for complete search history.

(56) References Cited

U.S. PATENT DOCUMENTS

| | | | |
|---|---|---|---|
| 2015/0074421 A1* | 3/2015 | Nagai | H04L 9/0822 713/189 |
| 2015/0074427 A1* | 3/2015 | Lewis | H04L 9/0894 713/193 |
| 2016/0012233 A1* | 1/2016 | Kawano | G06F 21/575 713/165 |
| 2016/0105282 A1* | 4/2016 | Henry | H04L 9/0825 713/190 |

* cited by examiner

VIRTUAL ROOT OF TRUST FOR DATA STORAGE DEVICE

CROSS-REFERENCE TO RELATED APPLICATION

This application claims the benefit of U.S. Provisional Application No. 62/441,715, entitled "VIRTUAL ROOT OF TRUST FOR DATA STORAGE DEVICE", and filed on Jan. 3, 2017, which is hereby incorporated by reference in its entirety.

BACKGROUND

An increasing amount of content such as movies and music are being distributed electronically. Various forms of Digital Rights Management (DRM), which invariably use cryptographic encryption techniques, can be used to help prevent unauthorized distribution or access of such high value content. In some cases, the secret keys for decrypting content may be stored in a Data Storage Device (DSD) along with the content. Such keys may be protected from unauthorized access outside of the DSD by encrypting the keys based on a Root of Trust (RoT) associated with the specific DSD storing the keys.

A RoT or Trust Anchor is a hardware or software component for which trust is assumed and not derived. This can include, for example, code that is trusted by an Operating System (OS) of a computer or other electronic device, such as initial boot code burned into a non-volatile Read Only Memory (ROM). RoTs are usually implemented as hardware or protected by hardware. A RoT in cryptographic systems is trusted to perform one or more security-critical functions such as validating firmware boot processes to help make sure that the computer system or electronic device is only started using its own unmodified startup code.

A RoT can be implemented with cryptographic keys or firmware boot code which can be stored in a dedicated, non-volatile processor memory such as ROM or eFuse that cannot be modified or rewritten in order to resist unauthorized changes or overwriting of the RoT. In order for a RoT to be specific to a DSD storing DRM keys, for instance, ROM is generally not a useful solution because it is typically the same from one device to the next. Another non-volatile processor memory may be used instead.

However, the hardware necessary for additional non-volatile processor memory can increase the cost and complexity of a microcontroller or System On a Chip (SoC) in a DSD. In addition, the size and cost of the microcontroller or SoC may be limited for an embedded DSD or memory card DSD to be used within or with a larger electronic device such as, for example, a Network Attached Storage (NAS) device or a media player device.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
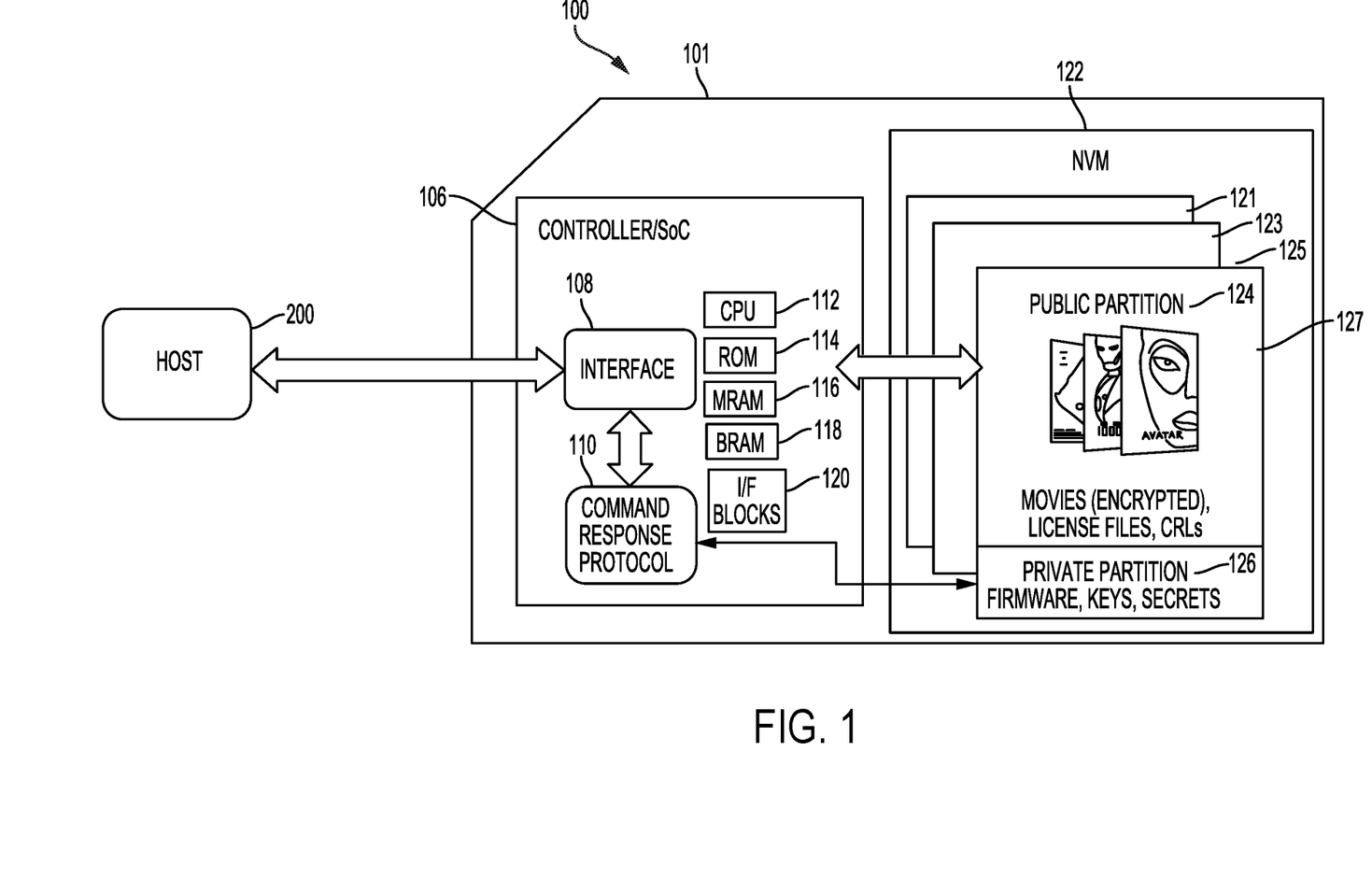
FIG. 1 is a block diagram of a Data Storage Device (DSD) and a host according to an embodiment.

FIG. 1 is a block diagram of secured Data Storage Device (DSD) 100 and host 200 according to an embodiment. In one example, secured DSD 100 can include a secured flash storage card (e.g., a Secure Digital (SD) non-volatile memory card or various types of MultiMedia Cards (MMCs)) or other type of DSD that can interface with host 200. In some implementations, host 200 can include, for example, another storage device such as a Network Attached Storage (NAS) device or other type of media server, a laptop computer, tablet, a smart phone, a game counsel, a Blu-Ray player, a flat panel TV, a media set top box, or other media player device. In some implementations, DSD 100 can be a removable memory card that interfaces with a card reader of host 200. In other implementations, DSD 100 can be embedded as a non-removable DSD within host 200.

Those of ordinary skill in the art will appreciate that other embodiments can include more or less than those elements shown in FIG. 1 and that the disclosed processes can be implemented in other environments with different configurations. For example, other embodiments can include a different number of hosts communicating with DSD 100.

As shown in FIG. 1, DSD 100 includes controller 106 on a single microcontroller die and Non-Volatile Memory (NVM) 122, which includes a stack of dies 121, 123, 125, and 127. In this disclosure, die and chip are used interchangeably to mean a single square of silicon cut from a silicon wafer. A die can include a Central Processing Unit (CPU) control functionality or it can include solid-state memory, such as flash NAND or other logic on silicon dies, such as peripheral controllers or co-processors. In other implementations, the solid-state memory of NVM 122 can include a single die instead of a stack of dies.

While the description herein refers to solid-state memory generally, it is understood that solid-state memory may comprise one or more of various types of memory devices such as flash integrated circuits, Chalcogenide Random Access Memory (RAM) (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), magnetoresistive RAM, other discrete Non-Volatile Memory (NVM) chips, or any combination thereof.

In the example of FIG. 1, DSD 100 is a secured DSD with controller 106 and NVM 122 sealed together inside multi-die package 101, which can include, for example, a single plastic package. In some implementations, package 101 can serve as part of a tamper-evident and/or tamper-resistive enclosure. For example, the individual dies or stacks of dies may be covered on one side by epoxy and on the other side by a substrate. A non-removable, tamper-evident plastic cover of package 101 can surround the substrate and the epoxy to help prevent unauthorized physical access to the dies.

In addition, the data stored in NVM 122 is further protected in the example of FIG. 1 with controller 106 only communicating with NVM 122 within package 101. NVM 122 is only connected to controller 106 so that all access to NVM 122 passes through controller 106. In this regard, there is no path exposed to access NVM 122 that bypasses controller 106.

As a further security measure, controller 106 does not access or use any RAM (e.g., Dynamic RAM (DRAM)) outside of the microcontroller die for controller 106. Controller 106 includes all its RAM (e.g., MRAM 116 and BRAM 118) and processing components on-chip in a single microcontroller die. In the case of a single microcontroller die, the space limitations for additional components such as a dedicated or additional non-volatile processor memory for implementing a hardware Root of Trust (RoT) can increase the cost and complexity of the microcontroller or System On a Chip (SoC). As discussed in more detail below, the present disclosure provides a secure way of using a portion of NVM 122 as private partition 126 for storing secured data that would otherwise need to be stored on-chip with controller 106.

In the example of FIG. 1, DSD 100 includes a single die controller 106, which can include, for example, a microcontroller or SoC with one or more processors (e.g., CPU 112) and one or more memories (e.g., ROM 114, MRAM 116, and BRAM 118). In other implementations, controller 106 can include other circuitry such as a Digital Signal Processor (DSP), an Application-Specific Integrated Circuit (ASIC), a Field Programmable Gate Array (FPGA), hard-wired logic, analog circuitry and/or a combination thereof. As shown in FIG. 1, controller 106 includes interface 108, command response protocol 110, CPU 112, Read Only Memory (ROM) 114, Main RAM (MRAM) 116, Buffer RAM (BRAM) 118, and various interface (I/F) blocks 120.

Interface 108 is configured to interface DSD 100 with host 200, and can interface according to a memory card interface standard such as, for example, SD or a type of MMC standard such as eMMC. In other embodiments, interface 108 may be configured to interface with host 200 via a bus or network, and may interface using, for example, Ethernet or WiFi, or a bus standard such as Serial Advanced Technology Attachment (SATA), PCI express (PCIe), Small Computer System Interface (SCSI), or Serial Attached SCSI (SAS). In such embodiments, host 200 and DSD 100 may not need to be physically co-located.

Command response protocol 110 can be a module for servicing commands from host 200 using a particular communications protocol for accessing data from NVM 122. As a security measure, controller 106 may only be capable of servicing certain commands from applications executing on host 200. In such an implementation, a command set, such as an allowed set of commands, may be stored as part of a non-upgradable firmware that cannot be modified that controller 106 can use to control access to areas of NVM 122 outside of private partition 126, such as public partition 124. The command set may also specify a certain procedure for storing data in NVM 122 or reading data from NVM 122. In such implementations, the command set may be stored in ROM 114 and/or in a firmware partition of private partition 126 in NVM 122 (e.g., firmware partition 128 in FIG. 3). In some implementations, command response protocol 110 may be executed by CPU 112 in sending data to and receiving data from host 200 via interface 108.

CPU 112 can include a processor for executing computer readable instructions such as firmware for controlling operation of DSD 100. ROM 114 may include firmware or other data that has been non-volatilely stored for access by CPU 112.

MRAM 116 can include a volatile memory for storing, for example, portions of computer executable code or other data being used by CPU 112. BRAM 118 can include a secondary volatile memory used for buffering data being used by CPU 112. In other implementations, MRAM and BRAM may include a non-volatile memory that can be randomly accessed (e.g., magnetoresistive RAM). In some implementations, MRAM and BRAM may temporarily store data that is used to access files or other data stored in NVM 122 in response to commands from host 200 via command response protocol 110. In other implementations, MRAM 116 and BRAM 118 may form a single memory of controller 106.

I/F blocks 120 include one or more components for interfacing with the dies of NVM 122. In an implementation where NVM 122 includes a NAND flash die stack, I/F blocks 120 can include a Flash Interface Module (FIM) for communicating with the flash memory dies of NVM 122.

As shown in FIG. 1, NVM 122 includes dies 121, 123, 125, and 127, with public partition 124 and private partition 126 stored in die 127. In the example of FIG. 1, private partition 126 stores non-volatile assets, such as firmware, keys, and/or other secured data that is accessed by controller 106, and would otherwise be stored as a part of a microcontroller die in conventional secured DSDs. Private partition 126 is not accessible to host 200 or to other users. Although private partition 126 is shown in FIG. 1 as being part of a single die in die 127, private partition 126 in other implementations may be stored as one full die or in multiple dies.

Public partition 124 includes files and data that may be accessed by host 200 via command response protocol 110 and interface 108. Controller 106 may restrict the access of host 200 to public partition 124. In the example of FIG. 1, public partition 124 includes encrypted movie files, together with license files and Certificate Revision or Revocation Lists (CRLs) used by controller 106 to authorize access to the encrypted files stored in public partition 124. Other implementations may not include public partition 124 or may store different types of data in public partition 124.

Figure 2:
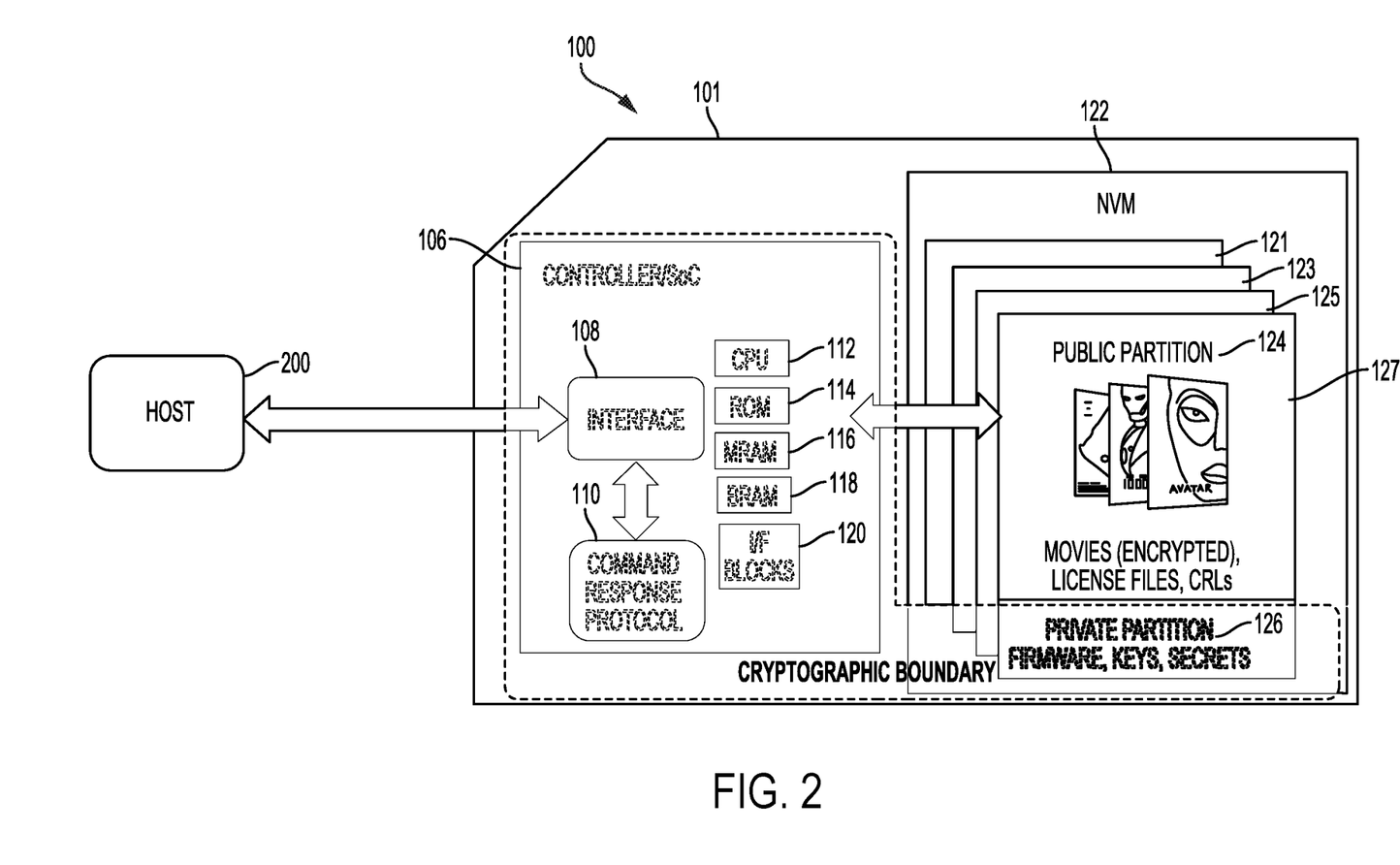
FIG. 2 is a diagram depicting a cryptographic boundary of a DSD according to an embodiment.

FIG. 2 is a diagram illustrating a cryptographic boundary of DSD 100 according to an embodiment. As shown in FIG. 2, the cryptographic boundary includes the controller die of controller 106 and private partition 126. The cryptographic boundary can include encrypted data stored in at least one memory of controller 106 (e.g., ROM 114, MRAM 116, and/or BRAM 118), in addition to private partition 126 in NVM 122. In one implementation, and as discussed in more detail below with reference to FIG. 3, CPU 112 may encrypt the data in the cryptographic boundary using one or more keys, such as a 128 bit Advanced Encryption Standard (AES) key.

Unlike conventional secured DSDs, DSD 100 does not need to use TrustZone or any hardware based mechanism to isolate security related assets from other assets in NVM. TrustZone is a feature of the ARM processor architecture that can allow a controller or SoC to hardware separate a rich Operating System (OS), from a typically smaller and more secure OS. Alternatively, some controllers or SoCs in a conventional secured DSD may include a dedicated security core or SoC.

In contrast to conventional secured DSDs, controller 106 of DSD 100 uses a write-once restricted portion of NVM outside of the microcontroller die or SoC and at least one encryption key associated with DSD 100 to encrypt security assets in the re-writeable restricted portion of NVM. The key or keys associated with DSD 100 can be based on or partially derived from a serial number or other identifier of DSD 100 or its user (e.g., host 200), or other number uniquely associated with DSD 100.

In the example of FIG. 2, confidentiality is provided via encryption. In some implementations, integrity protection can also be provided using a keyed-Hash Message Authentication Code (HMAC). The associated key used for encryption is referred to herein as HardWare Root of Trust (HWROT)1, and an associated, secret value or key used in HMAC calculations can be designated as HWROT2. As discussed in more detail with reference to FIGS. 3 and 4 below, HWROT1 and HWROT2 can be random values injected into DSD 100 during a manufacturing process, and stored in a NVM location that is protected against rewriting.

Figure 3:
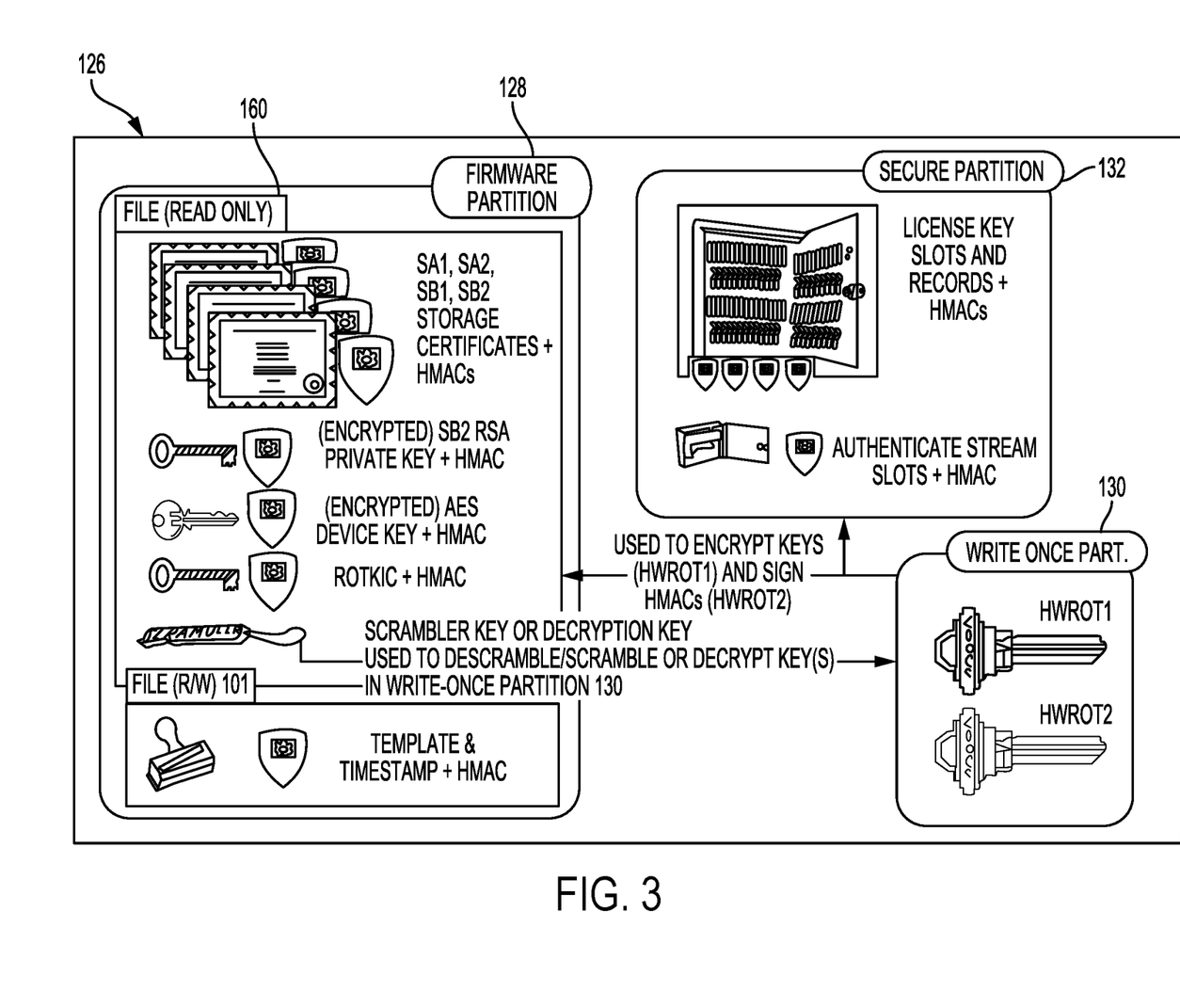
FIG. 3 is a diagram of an example implementation of a private partition of a DSD according to an embodiment.

FIG. 3 is a diagram of an example implementation of data stored in private partition 126 according to an embodiment. As shown in FIG. 3, private partition 126 includes firmware partition 128, write-once partition 130, and secure partition 132. Write-once partition 130 can store one or more keys or values associated with DSD 100, such as HWROT1 and HWROT2. Controller 106 through firmware executed by CPU 112 can prevent write-once partition 130 from being written to more than one time.

Firmware partition 128 can include firmware for execution by CPU 112, and as shown in FIG. 3, one or more keys and storage certificates. In addition, firmware partition 128 stores a scrambler key used to scramble HWROT1 and HWROT2 stored in write-once partition 130. In this regard, controller 106 may descramble HWROT1 and HWROT2 using the scrambler key stored in firmware partition 128. In addition, the keys stored in firmware partition 128 are encrypted with HWROT1 and authenticated using HWROT2.

In other implementations, firmware partition 128 may store a decryption key used to decrypt HWROT1 and HWROT2. In such implementations, the decryption key may be a symmetric key or an asymmetric key associated with an encryption key used to encrypt HWROT1 and HWROT2 stored in write-once partition 130. As discussed below with reference to FIG. 4, the encryption of HWROT1 and HWROT2 may be performed as part of a RoT initialization process during manufacturing.

Secure partition 132 includes license key slots and records that are used for authorizing access to corresponding content files stored in public partition 124. In one implementation, license keys for accessing content files are stored in respective slots associated with the content file. The license keys may also be encrypted using HWROT1 and authenticated using HWROT2.

As discussed above, write-once partition 130 can serve to segment security values, such as the keys stored in firmware partition 128 or the license key slots and records stored in secure partition 132 from the RoT keys associated with DSD 100 (e.g., HWROT1 and HWROT2) stored in write-once partition 130. By storing at least one key associated with DSD 100 in write-once partition 130 and using encryption within private partition 126, it is ordinarily possible to provide virtual Roots of Trust (RoTs) without using a dedicated memory or core in controller 106.

Figure 4:
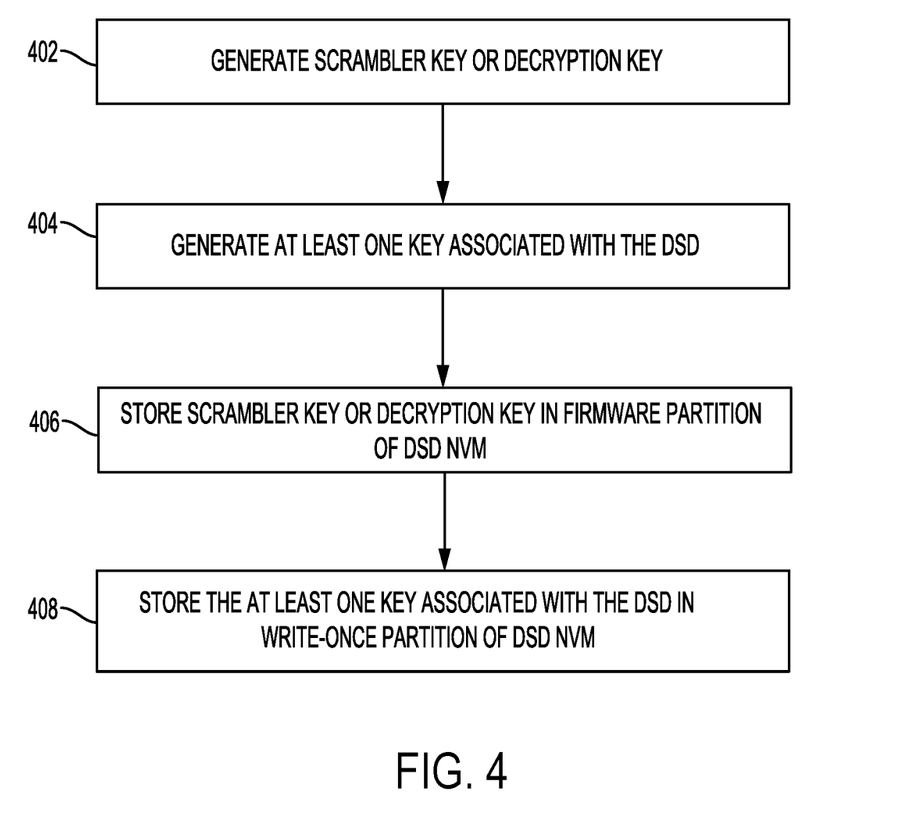
FIG. 4 is a flowchart for a Root of Trust (RoT) initialization process according to an embodiment.

FIG. 4 is a flowchart for a RoT initialization process according to an embodiment. The process of FIG. 4 can be performed, for example, as part of a manufacturing process of DSD 100 using a Hardware Security Module (HSM) and a secure production computer.

In block 402, a hardware scrambler key (e.g., the scrambler key stored in firmware partition 128 in FIG. 3) is generated. The scrambler key can be a random number unique to DSD 100. In this regard, the scrambler key serves as an additional RoT key stored outside of a write-once partition in the NVM of the DSD. In other implementations, an asymmetric or symmetric decryption key may be generated in block 402 instead of a scrambler key.

In block 404, at least one key associated with the DSD is generated for storage in a write-once partition of NVM. In the example of FIG. 3, this can include HWROT1 and HWROT2. As discussed above, HWROT1 and HWROT2 can also be based on or derived from a unique identifier associated with DSD 100, such as a serial number or other value that uniquely identifies DSD 100.

In block 406, the scrambler key or decryption key is stored in a firmware partition of NVM in the DSD (e.g., firmware partition 126 of NVM 122). In some implementations, a private partition and a public partition may also be created in the NVM as part of the process of FIG. 4. Firmware loaded into the DSD during the process of FIG. 4 may further configure the DSD so that the private partition of the NVM can only be internally accessed by an internal microcontroller or SoC (e.g., controller 106) of the DSD. In addition, the DSD may be configured such as through a command response protocol (e.g., command response protocol 110) so that external access to data stored in the DSD is restricted to accessing the public partition of the NVM.

In block 408, the at least one key associated with the DSD is stored in a write-once partition of NVM in the DSD (e.g., write-once partition 130 of NVM 122). In some implementations, block 408 may also include scrambling or encrypting the at least one key associated with the DSD using the scrambler key or an encryption key corresponding to a decryption key stored in block 406. Data stored in the private partition may also be encrypted in block 406 using the at least one key associated with the DSD.

As discussed above, by using a private partition of NVM outside of the microcontroller die or SoC/controller 106 and encrypting keys in different segments of the private partition, it is ordinarily possible to provide a secure, virtual RoT without providing additional hardware in the microcontroller die or SoC/controller 106.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A Data Storage Device (DSD), comprising:
   a Non-Volatile Memory (NVM) configured to include a private partition and a public partition, wherein the public partition is configured to store content files, and wherein:
      the private partition is configured to include a write-once partition, a secure partition, and a firmware partition,
      the write-once partition is configured to store a scrambled or encrypted first root of trust key associated with the DSD and a scrambled or encrypted second root of trust key associated with the DSD, wherein the first root of trust key is distinct from the second root of trust key,
      the secure partition is configured to store license keys for accessing the content files stored in the public partition, and
      the firmware partition is configured to store a scrambler key or a decryption key; and
   a controller including at least one memory, wherein the private partition of the NVM is configured to only be internally accessed by the controller, and wherein the controller is configured to:
      descramble or decrypt the scrambled or encrypted first root of trust key using the scrambler key or the decryption key;
      encrypt data stored in the at least one memory and in the private partition of the NVM using the first root of trust key, wherein the encrypted data includes the license keys;
      descramble or decrypt the scrambled or encrypted second root of trust key using the scrambler key or the decryption key; and
      authenticate data stored in the at least one memory and in the private partition using the second root of trust key.

2. The DSD of claim 1, further comprising a host interface for communicating with a host, and wherein the controller is further configured to restrict the host's access to the NVM to data stored in the public partition of the NVM.

3. The DSD of claim 1, wherein the controller is further configured to control access to the NVM based on an allowed set of commands included in a firmware stored in the at least one memory of the controller or in the private partition of the NVM.

4. The DSD of claim 1, wherein the controller and the NVM are sealed together in a multi-die package.

5. The DSD of claim 1, wherein the DSD is a removable memory card that can interface with a card reader of another electronic device.

6. A Data Storage Device (DSD), comprising:
   a Non-Volatile Memory (NVM) configured to include a firmware partition, a public partition for storing content files, a secure partition for storing license keys for accessing the content files stored in the public partition, and a write-once partition configured to be written to only once; and
   a controller configured to:
      descramble or decrypt a scrambled or encrypted first root of trust key for the DSD that is stored in the write-once partition using a scrambler key stored in the firmware partition or a decryption key stored in the firmware partition;
      descramble or decrypt a scrambled or encrypted second root of trust key for the DSD that is stored in the write-once partition using the scrambler key stored in the firmware partition or the decryption key stored in the firmware partition, wherein the first root of trust key is distinct from the second root of trust key;
      encrypt at least one other key stored in the firmware partition using the first root of trust key;
      encrypt license keys stored in the secure partition using the first root of trust key; and
      authenticate the at least one other key stored in the firmware partition using the second root of trust key.

7. The DSD of claim 6, wherein:
   the NVM includes a private partition for storing the firmware partition and the write-once partition; and
   the private partition is configured to only be internally accessed by the controller.

8. The DSD of claim 6, wherein the controller is further configured to encrypt at least one additional key stored in the firmware partition using the descrambled or decrypted first root of trust key associated with the DSD that is stored in the write-once partition.

9. The DSD of claim 6, wherein:
   the DSD further comprises a host interface for communicating with a host; and the controller is further configured to restrict the host's access to the NVM to data stored in the public partition of the NVM.

10. The DSD of claim 6, wherein the controller is further configured to control access to the NVM based on an allowed set of commands included as part of a firmware stored in at least one memory of the controller or in the private partition.

11. The DSD of claim 6, wherein the controller and the NVM are sealed together in a multi-die package.

12. The DSD of claim 6, wherein the DSD is a removable memory card that can interface with a card reader of another electronic device.

13. A method for establishing a root of trust in a Data Storage Device (DSD), the method comprising:
creating a public partition in a Non-Volatile Memory (NVM) of the DSD, the public partition for storing content files;
creating a secure partition in the NVM for storing license keys for accessing the content files stored in the public partition;
generating a scrambler key or a decryption key;
generating a first root of trust key associated with the DSD;
generating a second root of trust key associated with the DSD, wherein the first root of trust key is distinct from the second root of trust key;
storing the scrambler key or the decryption key in a firmware partition of the NVM;
scrambling the first and the second root of trust keys using the scrambler key or encrypting the first and the second root of trust keys using an encryption key associated with the decryption key, wherein the decryption key is a symmetric or asymmetric key for the encryption key; and
storing the scrambled or encrypted first and second root of trust keys associated with the DSD in a write-once partition of the NVM configured to be written to only once, wherein the first root of trust key is used to encrypt the license keys and data for storage in the firmware partition and the second root of trust key is used to authenticate data stored in the firmware partition.

14. The method of claim 13, further comprising:
creating a private partition in the NVM; and
configuring the DSD so that the private partition can only be internally accessed by a controller of the DSD.

15. The method of claim 13, further comprising:
creating a private partition in the NVM; and
encrypting data stored in the private partition using the first root of trust key associated with the DSD.

16. The method of claim 13, further comprising:
configuring the DSD to restrict external access of the DSD to data stored in the public partition of the NVM.

17. A Data Storage Device (DSD), comprising:
a Non-Volatile Memory (NVM) configured to include a firmware partition, a public partition for storing content files, a secure partition for storing license keys for accessing the content files, and a write-once partition configured to be written to only once; and
means for:
descrambling or decrypting a scrambled or encrypted first root of trust key for the DSD that is stored in the write-once partition using a scrambler key stored in the firmware partition or a decryption key stored in the firmware partition;
descrambling or decrypting a scrambled or encrypted second root of trust key for the DSD that is stored in the write-once partition using the scrambler key stored in the firmware partition or the decryption key stored in the firmware partition, wherein the first root of trust key is distinct from the second root of trust key;
encrypting at least one other key stored in a private partition of the NVM using the first root of trust key;
encrypting the license keys using the first root of trust key; and
authenticating the at least one other key stored in the private partition using the second root of trust key.

18. The DSD of claim 1, wherein the data encrypted using the first root of trust key includes at least one other key stored in the private partition.

* * * * *